March 9, 1971     R. T. STAUNTON     3,568,416

FILTER ASSEMBLY

Filed Sept. 9, 1968

INVENTOR.
Richard T. Staunton
BY
George A. Schmidt
ATTORNEY

United States Patent Office 3,568,416
Patented Mar. 9, 1971

3,568,416
FILTER ASSEMBLY
Richard T. Staunton, Birmingham, Mich., assignor to
G. S. Staunton & Company, Inc., Royal Oak, Mich.
Filed Sept. 9, 1968, Ser. No. 758,532
Int. Cl. B01d 25/06
U.S. Cl. 55—486                                    9 Claims

ABSTRACT OF THE DISCLOSURE

An improvement in filter assemblies for use in air treatment machines, such as air conditioners and the like. The assembly includes a honeycomb structure having a plurality of passages therein and aligned in the direction of air flow. Some of the passages in the honeycomb structure are filled with granular filter material, such as activated carbon, and others of the passages are unfilled. A member adapted to permit air flow therethrough is secured adjacent to the honeycomb structure at each surface thereof to retain the granular material in the passages. An additional layer of open cell filter material may be secured adjacent the downstream member for additional filtering as necessary. The entire assembly is enclosed in a border frame structure, and may be formed of throw-away materials or may be made of permanent materials.

---

This invention relates to filter assemblies, and more particularly to an air filter assembly of the type adapted to be used in air treating devices, such as air conditioners.

In the design and manufacture of air treating devices, such as air conditioners, blowers, humidifiers, dehumidifiers, deodorizers and the like, or any other device in which air is passed therethrough and where such air must be filtered to some degree, it is often necessary and desirable to provide some sort of air filtration means to collect and remove dirt, dust, smoke, odors and other airborne impurities from the air passing through the device. While there are as many different types of air filter assemblies as there are types of equipment using such assemblies, there are certain design requirements for the air filter assembly which lead to proper and efficient operation of the machine and most efficient removal of airborne impurities. The technical requirements are, of course, most important, including such things as an efficient filter material, the amount of pressure across the filter element so as to blow or draw sufficient air through the filter assembly, the shape and dimensions of the filter assembly and its location and securement in the device. Also important are considerations such as cost, ease in manufacture and assembly, shipment and storage of the filter assemblies and whether such assemblies are of a permanent nature or a throw-away nature.

It is hereby proposed to provide a filter assembly for use in air treating machinery or the like, which is extremely economical to manufacture and produce, is efficient in its operation and has a great deal of versatility so as to permit adaptation to numerous different kinds of air treating machines and technical design requirements. The filter assembly in which this invention is embodied comprises, generally, a honeycomb structure having a multiplicity of passages extending completely through the structure and in the direction of air flow. A selected number of the passages are filled with a granular filter material, while others of the passages may be left open. Mesh or screen members are located at opposite surfaces of the honeycomb structure and serve to retain the granular material in the honeycomb passages. Should additional filtering be necessary, an open cell filter media may be secured adjacent the downstream mesh or screen member. The entire assembly is encircled by a supporting frame, the dimensions and design of which are suitable for quick and simple installation in the air treatment device with which the assembly is used. The filter assembly may be made of materials that are permanent in nature, so that the filter assembly, when dirty or clogged with impurities removed from the air, may be cleaned in any suitable manner and reinstalled in the machine. Alternatively, the filter assembly may be made of relatively inexpensive materials, so that when the assembly is clogged or dirty, it may be removed from the machine and discarded for replacement by a new assembly.

Such an air filter assembly is easily and efficiently manufactured, produced, assembled, shipped and stored, and easily meets the technical design requirements of the air treatment machinery with which the assembly is used. The honeycomb structure permits a preselected pattern of filling with granular material, thus permitting a preselected by-pass of air through the assembly without filtering, to accommodate varying air treatment machine pressures and to avoid detriment to the operation of the machine. In other words, the unfilled passages in the honeycomb structure permit air by-pass to any desired degree, thus the efficiency of the filter assembly can be best selected for the machine with which the assembly is used. Thus, the efficiency is maximized and cost in manufacture and use is minimized for the filter construction.

These and other advantages will become apparent from the following description, used to illustrate preferred embodiments of the invention when taken with the accompanying drawing in which.

Figure 1:
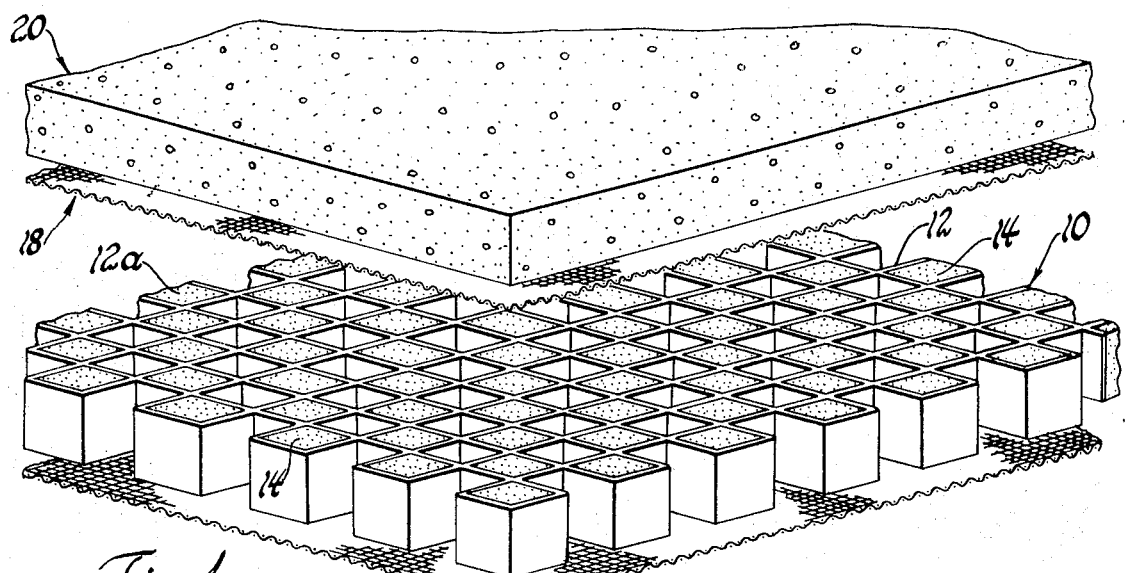
FIG. 1 is an exploded view, parts broken away and in section, of a filter assembly embodying the present invention.
Figure 2:
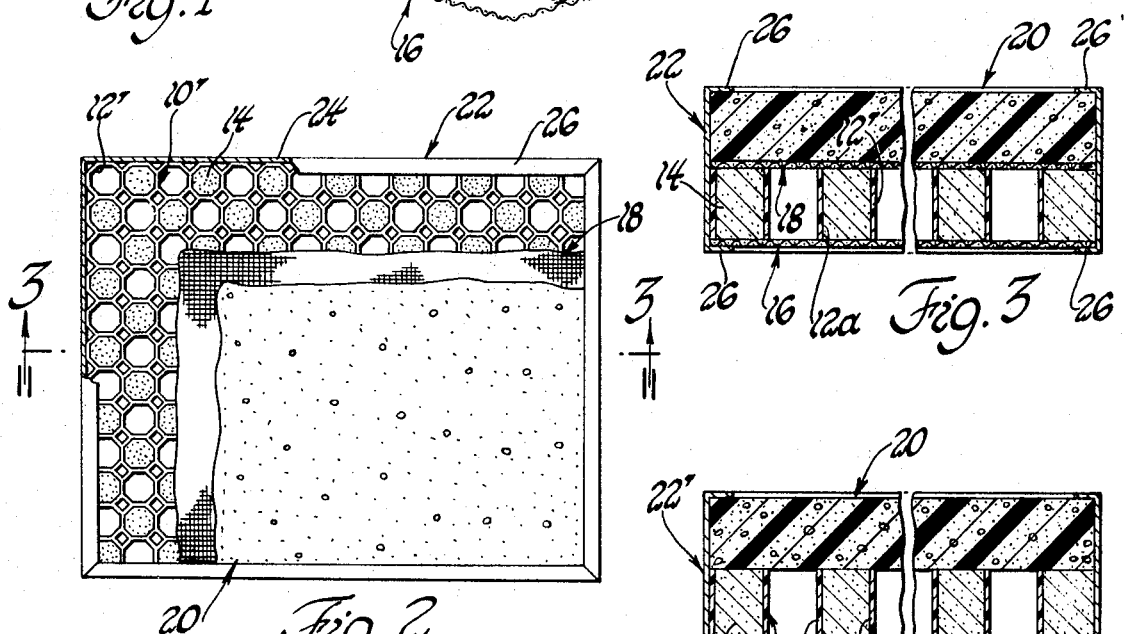
FIG. 2 is a plan view, with parts broken away and in section, of a filter assembly embodying the present invention.

Referring more particularly to the drawing, where the figures are for the purpose of illustrating preferred embodiments of the invention only, and not for the purpose of limiting same, FIG. 1 best illustrates the overall assembly construction. The basic part of the filter assembly is the honeycomb structure, indicated generally by the numeral 10, which is of suitable shape and dimension to extend completely across the filter assembly. Honeycomb structure 10 includes a plurality of passages 12 and 12A which extend completely through the structure 10 and which are arranged in the direction of air flow through the filter assembly. Although FIG. 1 illustrates the honeycomb structure to have passages that are square, or rectangular, in cross-section and, as will be later described, FIG. 2 illustrates a honeycomb structure in which the passages are octangular in cross-section, it is to be understood at the outset that the particular cross-sectional shape of the honeycomb passages is not critical to the invention, but leads to design variations in the filter capacity, as will be hereinafter described. It is sufficient for purposes of illustrating the invention, that the passages be of some cross-sectional configuration, preferably polygonal, and extend completely through the honeycomb structure so that the passages are open at both ends.

In the passages 12A of the honeycomb structure 10 are disposed granules of particulate filter material, to filter the air flowing through these passages. The material 14 may be of any suitable granular adsorbent material, although it is preferred that activated carbon of suitable particle size be utilized. As is apparent in FIG. 1, not all of the passages in the honeycomb structure 10 are filled with granular material 14, so that the passages 12 remain open to unhindered air flow through the structure 10. Only the air flowing through the passages 12A and the granular material 14 therein is filtered in this part of the filter assembly.

On the upstream side of the honeycomb structure 10 is a mesh material, indicated generally by the numeral 16, which is of suitable mesh size to retain the particles of granular material 14 in the passages 12A of the honeycomb structure 10. The member 16 may be of any suitable material and may be secured to the upstream side of the honeycomb structure 10, as by heat sealing, adhesion or other suitable means. Alternately, the member 16 need not be secured directly to the honeycomb structure 10 but may be held in place by some other means.

At the downstream side of the honeycomb structure 10 is a second mesh member, indicated generally by the numeral 18, which is similar in all respects to member 16 and the purpose for which is to retain the granular material 14 in the honeycomb structure 10. Member 18 may be of any suitable material and may be secured in place adjacent the downstream surface of the honeycomb structure 10 in any suitable manner.

Should further filtration of the air passing through the filter assembly be necessary, and particularly to provide some filtering to the air passing through the open passages 12 in the honeycomb structure 10, a batt of open cell filter material, indicated generally by the numeral 20, may be provided. The filter material 20 is secured to the remainder of the assembly in any suitable manner, and may conveniently be formed of open cell foam of convenient shape and dimension to extend completely across the filter assembly.

Referring next to FIG. 2, a filter assembly is illustrated that is substantially the same as that illustrated in FIG. 1, except that the honeycomb structure, indicated generally by the numeral 10', contains passages of octagonal cross-sectional configuration. The honeycomb structure 10' is still provided with an upstream mesh member 16, a downstream mesh member 18 and, if desirable, a batt of open cell filter material 20, as heretofore described. A predetermined pattern of passages 12A in the honeycomb structure 10' are filled with granular adsorbent material 14, retained in place by the mesh members 16 and 18, and certain other passages 12 remain unfilled if low pressure drop is required.

Surrounding the upper and lower mesh members 16 and 18, the honeycomb structure 10' and the filter material 20 is a frame, indicated generally by the numeral 22. Frame 22 encircles the edge of the assembly, as at 24, and has inwardly extending flanges 26 at the outside surfaces of the filter assembly. The frame structure 22 serves to hold together the assembly and to provide a degree of rigidity for mounting in the air treatment machine with which the assembly is used. Frame 22 may be formed in any convenient manner, depending on the materials used, the only requirement being that it surround the filter assembly, retain the parts together as described and fit conveniently in the air treatment machine.

Figure 3:
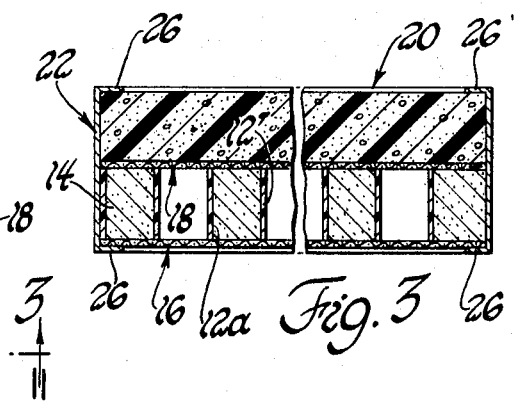
FIG. 3 is a cross-sectional view of the filter assembly illustrated in FIG. 2, taken substantially along the line 3—3 of FIG. 2 and looking in the direction of the arrows.
Figure 4:
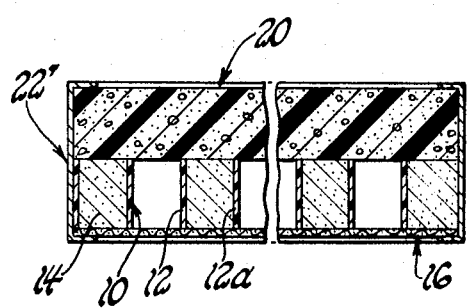
FIG. 4 is a cross-sectional view similar to FIG. 3, illustrating a modification of the air filter assembly shown in FIG. 2.

With reference now to FIG. 4, a modification of the filter assembly heretofore described is illustrated. The honeycomb structure, indicated generally by the numeral 10, may have passages 12 and 12A of any suitable cross-sectional configuration, the passages 12A being filled with granular material 14 as heretofore described. The lower member 16 is a suitable mesh member having sufficient fineness of mesh to retain the granular material 14 in the passages 12A. Downstream of the honeycomb structure 10, a batt of open cell filter material 20 is provided and is secured directly against the downstream surface of the honeycomb structure 10, eliminating the need for a second mesh member, such as member 18 illustrated in FIGS. 1–3. This may be possible by providing a filter material 20 that has a surface to prevent the granules of filter material 14 from spilling out of the passages 12A. A frame structure 22' surrounds the assembly of the lower screen 16, the honeycomb 10 and the upper filter media 20.

Figure 5:
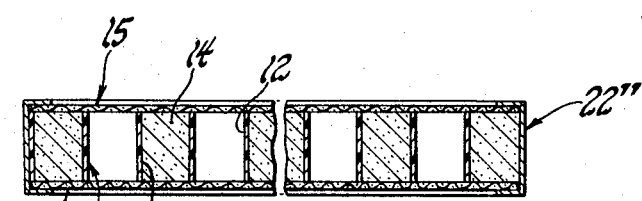
FIG. 5 is a cross-sectional view similar to FIG. 3, illustrating yet another modification of the assembly shown in FIG. 2.

With reference next to FIG. 5, yet another modification of the structure is illustrated, in which the upper filter batt of open cell filter material is eliminated entirely. The assembly shown in FIG. 5 includes a honeycomb structure 10 having passages 12 and 12A, of any suitable cross-sectional configuration, passages 12 being empty and passages 12A being filled with granular material 14. Lower screen or mesh member 16 and upper screen or mesh member 18 are secured adjacent the honeycomb structure 10 in any suitable manner, upstream and downstream of the structure 10, to retain the granular material 14 in the preselected passages. A frame structure 22'' serves to hold the assembly together and to provide means for inserting the structure in an air treatment machine.

It will be apparent from the foregoing description that air passing through the filter assembly must first pass through the lower mesh or screen 16 and into the honeycomb structure 10. Once through the honeycomb structure, the air flows through the downstream screen or mesh 18, and/or the filter material 20. By proper selection of the number of passages 12A in the honeycomb structure 10, the pressure drop across the filter assembly can be controlled to adapt the filter assembly to different types of air treatment machines. The air passing through the unfilled passages 12 is relatively unhindered, as the only interference is the mesh or screens 16 and 18 and the filter media 20, if such is used. However, such air is not required to pass through any of the granular filter material in the passages 12A. If half of the passages in the honeycomb structure 10 are filled with granular filter material 14, then theoretically half of the air passing through the honeycomb structure 10 will by-pass the filtering material 14 and flow relatively unhindered through the assembly. If 75% of the passages in the honeycomb structure 10 are filled with granular filter material 14, then 25% of the air passing through the honeycomb structure will be unfiltered. If all of the passages in the honeycomb structure 10 are filled with filter material 14, then all of the air passing through the honeycomb structure will be filtered. Thus, the filter assembly may be tailored to the amount of pressure available to force or draw the air through the filter assembly in the particular machine with which the assembly is used.

The material from which the various elements of the filter assembly are manufactured may be of permanent form; for example, a honeycomb of aluminum, other metallic material or plastic, and screens of a plastic material or metal mesh, along with a metallic frame, so that the filter asembly is a relatively permanent affair which may be removed from the air treatment machine for cleaning and restoration to the machine. On the other hand, the material from which the assembly is manufactured may be of less permanent, and less expensive, form. For example, a honeycomb structure of paper and screen or mesh members of plastic or other inexpensive material, surrounded by a frame of cardboard or the like, so that the entire assembly, once it becomes dirty or clogged from prolonged filtering, may be removed from the air treatment machine and discarded. A new and like such assembly would then be inserted in the machine for filtering, or the user could install a permanent type filter assembly as heretofore described.

Thus, an air filter assembly is provided which is extremely versatile in design and is adaptable to a great number of different types of air treatment machines. The air filter assembly, with its honeycomb design, can provide any degree of by-pass desired to accommodate the filter assembly to the amount of pressure or force available in the machine. The structure may be made to be permanent or throw-away in nature, depending upon the desires of the user, by adapting the various materials from which the filter assembly is manufactured. The overall result is an extremely efficient and economical assembly, easily manufactured, assembled, shipped, stored and used. The frame structure of the assembly may be of any suitable nature so as to easily fit within existing air treatment machines, and may be provided with any suitable fastening devices necessary or desirable in the machine design.

Having thus described the invention, I claim:

1. An air filter assembly comprising:
   a first porous member adapted to permit relatively unhindered air flow therethrough;
   a second member adjacent said first member and having a plurality of openings therethrough to define a plurality of separate flow passages disposed in the direction of air flow;
   granular filter material disposed in some of said passages to filter the air flowing through said some of said passages, the others of said passages permitting air flow therethrough without filtering;
   said second member being divisable into equal units of area and said passages having granular filter material disposed therein being in a preselected pattern in said second member such that the number of passages containing said filter material in one of said units of area is the same as the number of passages containing said filter material in any other of said units of area;
   a second porous member adjacent said second member and on the opposite side thereof from said first porous member, said first porous member and said second porous member retaining said granular filter material in said some of said passages;
   and frame means securing said members together to form a self-contained filter assembly.

2. The filter assembly set forth in claim 1 wherein said frame means securing said members together includes a supporting border frame extending around said first porous member, said second member and said second porous member.

3. The filter assembly set forth in claim 1 and further including an open celled element of filter material adjacent said second porous member and downstream of said second porous member and secured in said filter assembly.

4. The filter assembly set forth in claim 1 wherein said second porous member is an element of open celled filter material.

5. The filter assembly set forth in claim 1 wherein said first porous member and said second porous member are bonded to said second member.

6. The filter assembly set forth in claim 1 wherein said passages in said second member are in regular array.

7. The filter assembly set forth in claim 6 wherein said passages are polygonal in cross section.

8. The filter assembly set forth in claim 1 wherein said second porous member is a mesh screen.

9. The filter assembly set forth in claim 4 and further including an element of open celled filter material adjacent said second porous member and downstream of of said second porous member and secured in said filter assembly.

References Cited

UNITED STATES PATENTS

| | | | |
|---|---|---|---|
| 1,843,446 | 2/1932 | Drager | 55—387 |
| 3,458,977 | 8/1969 | Young et al. | 55—514 |
| 3,217,471 | 11/1965 | Silverman | 55—387 |
| 3,225,526 | 12/1965 | Bayles et al. | 55—482 |
| 3,243,942 | 4/1966 | Burke | 55—387 |
| 3,350,860 | 11/1967 | Grassel et al. | 55—387 |
| 3,358,427 | 12/1967 | Bub | 55—489 |
| 3,360,133 | 12/1967 | Proulx | 55—482 |
| 3,436,352 | 4/1969 | Revoir et al. | 55—387 |

FOREIGN PATENTS

| | | | |
|---|---|---|---|
| 978,465 | 12/1964 | Great Britain | 55—490 |

FRANK W. LUTTER, Primary Examiner

B. NOZICK, Assistant Examiner

U.S. Cl. X.R.

55—490, 514, 522